(12) United States Patent
Westfall

(10) Patent No.: US 8,977,422 B1
(45) Date of Patent: Mar. 10, 2015

(54) ACCOUSTIC/VIBRATION SENSOR AND TIRE ASSEMBLY AND METHOD OF CONSTRUCTION THEREOF

(71) Applicant: The Goodyear Tire & Rubber Company, Akron, OH (US)

(72) Inventor: David Michael Westfall, Uniontown, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 10 days.

(21) Appl. No.: 14/072,870

(22) Filed: Nov. 6, 2013

(51) Int. Cl.
*G01M 17/00* (2006.01)
*G07C 5/00* (2006.01)

(52) U.S. Cl.
CPC .................................... *G07C 5/006* (2013.01)
USPC ....................................................... 701/30.6

(58) Field of Classification Search
None
See application file for complete search history.

(56) References Cited

U.S. PATENT DOCUMENTS

| | | | |
|---|---|---|---|
| 5,218,861 A | 6/1993 | Brown et al. | |
| 6,192,951 B1 | 2/2001 | Maruyama et al. | |
| 6,653,936 B2 | 11/2003 | Bohm et al. | |
| 6,919,799 B2 | 7/2005 | Wilson et al. | |
| 7,082,818 B2 | 8/2006 | Wilson | |
| 7,151,495 B2 | 12/2006 | Strache et al. | |
| 7,680,749 B1 * | 3/2010 | Golding et al. | 706/14 |
| 8,024,965 B2 | 9/2011 | Albohr et al. | |
| 2003/0048178 A1 | 3/2003 | Bonardi et al. | |
| 2004/0159383 A1 | 8/2004 | Adamson et al. | |
| 2006/0025897 A1 * | 2/2006 | Shostak et al. | 701/1 |
| 2008/0216567 A1 | 9/2008 | Breed | |
| 2012/0291936 A1 | 11/2012 | Lionetti et al. | |
| 2014/0190426 A1 * | 7/2014 | Carvignese et al. | 123/2 |
| 2014/0202423 A1 * | 7/2014 | Carvignese et al. | 123/321 |

FOREIGN PATENT DOCUMENTS

| | | |
|---|---|---|
| EP | 2186658 B1 | 7/2012 |
| FR | 2936185 A1 | 3/2010 |
| JP | 2001063325 A | 3/2001 |
| JP | 2004114788 A | 4/2004 |

* cited by examiner

*Primary Examiner* — Thomas Tarcza
*Assistant Examiner* — Adam Alharbi
(74) *Attorney, Agent, or Firm* — Robert N. Lipcsik

(57) ABSTRACT

A system maintains integrity of a vehicle, a wheel, and/or a tire. The system includes a sensor mounted to the wheel or the tire and a processor for receiving data from the sensor. The processor analyzes the data and forms a status estimation of the vehicle, the wheel, and the tire. The processor further transmits the status estimation and a recommendation for repair to an appropriate party.

4 Claims, 14 Drawing Sheets

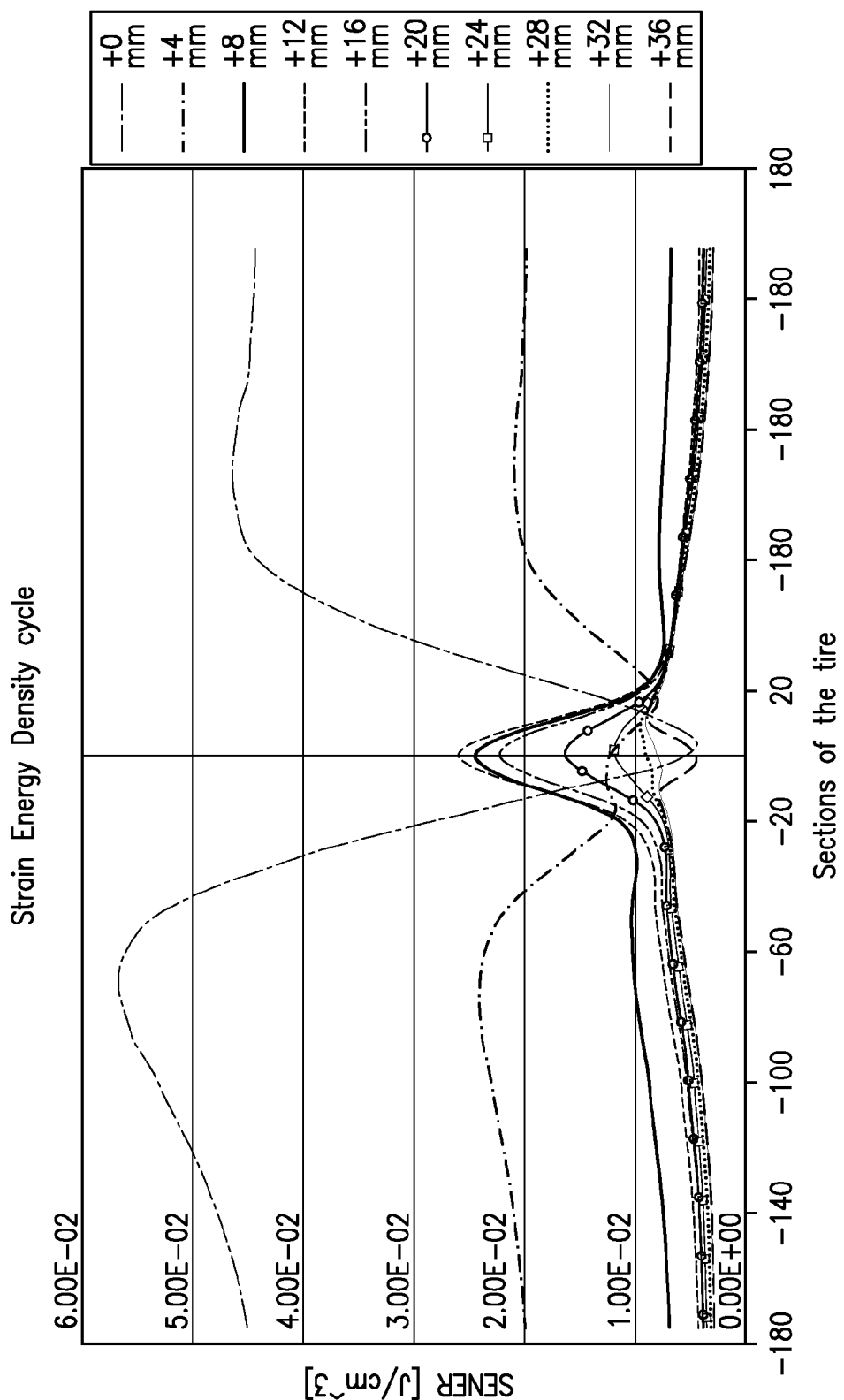

ACCOUSTIC/VIBRATION SENSOR AND TIRE ASSEMBLY AND METHOD OF CONSTRUCTION THEREOF

FIELD OF THE INVENTION

The invention relates generally to a transponder and tire assembly and method of construction and, more specifically, to a tire in which a vibration sensor is attached to the tire and/or a wheel for operational deployment as an assembly.

BACKGROUND OF THE INVENTION

A tire assembly incorporating an embedded electronic device, such as a passive UHF radio frequency identification transponder, enables automatic identification/preventative/diagnostic processes to be employed during a life cycle of a pneumatic tire. Such processes enable efficiencies in manufacturing, logistic supply chain, and tire service for maintenance and other service operations. These efficiencies are realized from the capability to track a pneumatic tire by using a unique asset identifier, such an EPC code assigned to a transponder assembled into the pneumatic tire. Embedding a transponder into a pneumatic tire as early as possible in the tire manufacturing process maximizes the potential benefits, but must be done in a manner that does not compromise transponder or tire performance, either during the manufacturing process or during the service life of the pneumatic tire.

SUMMARY OF THE INVENTION

A system in accordance with the present invention maintains integrity of a vehicle, a wheel, and/or a tire. The system includes a sensor mounted to the wheel or the tire and a processor for receiving data from the sensor. The processor analyzes the data and forms a status estimation of the vehicle, the wheel, and the tire. The processor further transmits the status estimation and a recommendation for repair to an appropriate party.

According to another aspect of the system, the sensor is an acoustic sensor.

According to still another aspect of the system, the sensor is a vibration sensor.

According to yet another aspect of the system, the processor receives the data through an intermediate device.

According to still another aspect of the system, the intermediate device is a vehicle computer.

According to yet another aspect of the system, the vehicle, the wheel, and the tire. The processor further transmits the status estimation and a recommendation for repair to an appropriate party.

According to still another aspect of the system, the intermediate device is a GPS network.

According to yet another aspect of the system, the intermediate device is a smart phone.

According to still another aspect of the system, the intermediate device is a hardwired network.

According to yet another aspect of the system, the data from the sensor is used by the processor for determining road conditions at selected GPS coordinates.

According to still yet another aspect of the system, the sensor is mounted to the tire.

According to yet another aspect of the system, the sensor is mounted to the wheel.

According to still yet another aspect of the system, other vehicles accurately determine road conditions.

According to yet another aspect of the system, the processor is in communication with a common repository such that data from the sensor is combined with data from sensors of the other vehicles for cross-referencing and determination of road conditions.

According to still another aspect of the system, the processor recommends tire rotation to the appropriate party.

According to yet another aspect of the system, the processor recommends a traction control update to the appropriate party.

According to still another aspect of the system, the processor recommends vehicle alignment to the appropriate party.

According to yet another aspect of the system, the common repository determines the GPS coordinates of a pothole.

A pneumatic tire and tag assembly, for use with the present invention, includes a tire carcass having one or more radially inner ply components extending around an annular bead member to a ply turnup portion, the ply turnup portion extending radially outward from the bead member to a ply turnup end. The tire carcass further includes a barrier layer component positioned axially inward from and adjacent to the ply component and an electronic tag device embedded within the tire carcass between the barrier layer component and the ply component in a lower sidewall region of the tire carcass.

In another aspect, the electronic tag is positioned at a radial tag distance from a lower sidewall toe location greater than a radial ply turn-up end distance from the lower sidewall toe location. The radial tag distance is preferred within a radial range of 15 percent and 35 percent of the tire section height as measured with reference to the lower sidewall toe location.

According to a further aspect, the tag is transmission-operative when embedded within the tire carcass between the barrier layer component and the ply component during green tire construction.

A method of constructing a pneumatic tire and tag assembly of the foregoing configuration, for use with the present invention, is provided.

DEFINITIONS

"Aspect ratio" of the tire means the ratio of its section height (SH) to its section width (SW) multiplied by 100% for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Camber angle" means the angular tilt of the front wheels of a vehicle. Outwards at the top from perpendicular is positive camber; inwards at the top is negative camber.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Groove" means an elongated void area in a tread that may extend circumferentially or laterally about the tread in a straight, curved, or zigzag manner. Circumferentially and laterally extending grooves sometimes have common portions. The "groove width" is equal to tread surface area occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant but vary from the depth of another groove in the tire. If such narrow or wide grooves have a substantially reduced depth as compared to wide circumferential grooves, these grooves may be regarded as forming "tie bars" tending to maintain a rib-like character in tread region involved.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sener" is a measurement of the dissipated energy due to a deformation of a measured element, looking at the strain energy density cycle at a defined position. The cycle is defined by maximum and minimum.

"Sipe" means small slots molded into the tread elements of the tire that subdivide the tread surface and improve traction, sipes are generally narrow in width and close in the tires footprint as opposed to grooves that remain open in the tire's footprint.

"Slip angle" means the angle of deviation between the plane of rotation and the direction of travel of a tire.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The present invention will be described by way of example and with reference to the accompanying drawings, in which:

FIG. 9B is a graph of SENER Gradient vs. Strain Energy Density at Sections of the Tire for the Tag Position of FIG. 9A.

DETAILED DESCRIPTION OF THE PRESENT INVENTION

Figure 1:
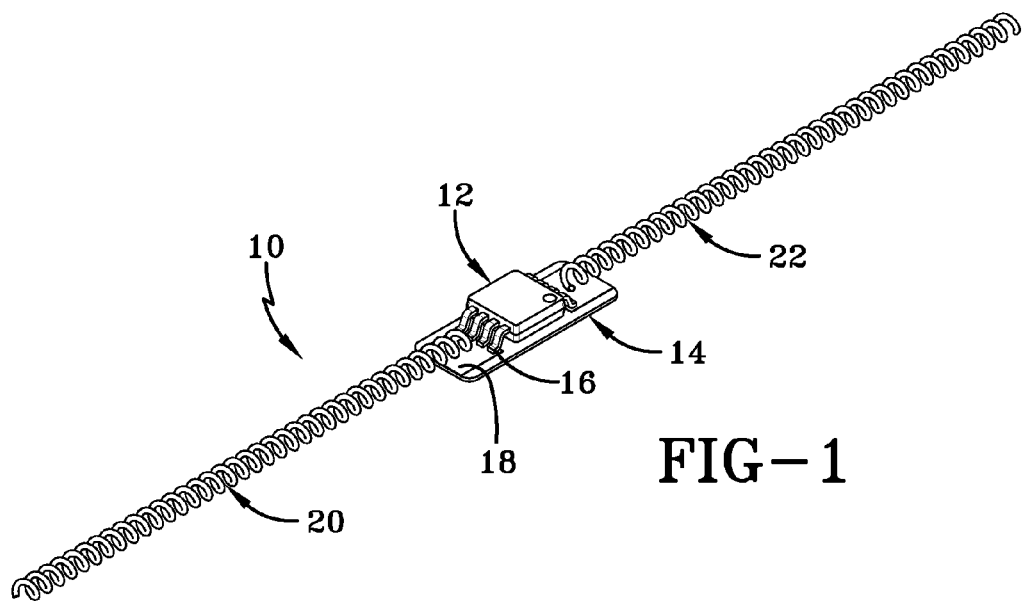
FIG. 1 is a perspective view of an electronic tire tag assembly.
Figure 2:
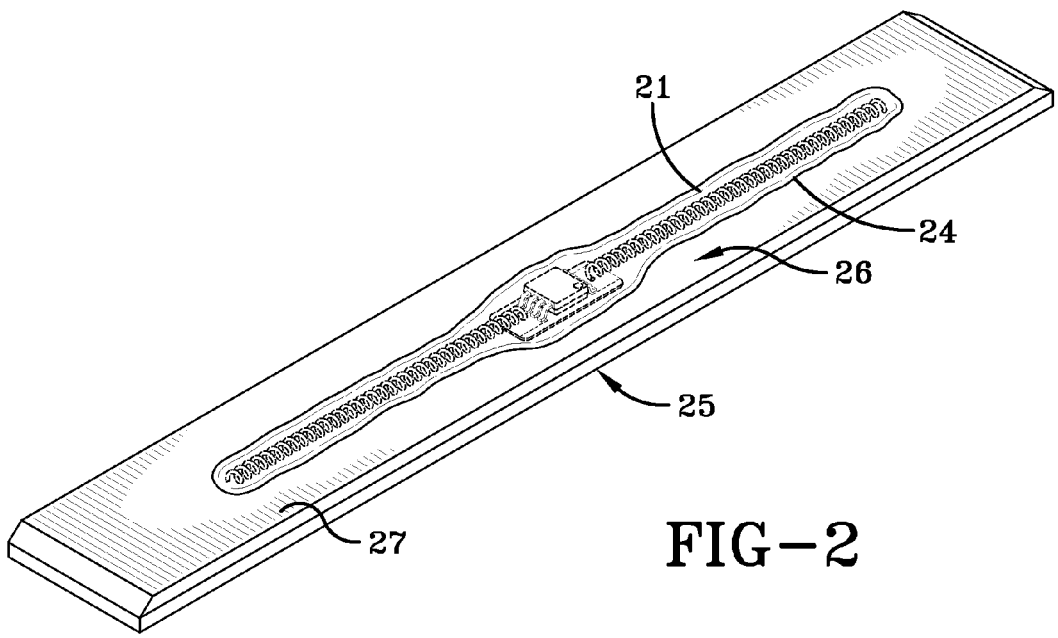
FIG. 2 is a perspective view of the tag encased in a carrier strip.

Referring to FIGS. 1 & 2, a conventional electronic tire tag or transponder 10 may include an antenna formed by a pair of coiled antenna segments 20, 22. An integrated circuit package (IC) 12 may be mounted to a carrier substrate 14 and may include interconnection leads 16 extending from opposite IC package sides, respectively, to engage a contact pad 18. The antennae 20, 22 may be electrically connected to the IC leads 16 and suitably tuned to a predetermined radio frequency "f" for receiving and transmitting RF signals from/to an external transceiver (not shown). A coating 24 of suitable material, such as epoxy, may encase and protect the transponder 10. The coated transponder 10 may mount to an upper surface 27 of a pair of layered green gum strips 25, 26. The package 12 may then be incorporated into a green tire carcass during a tire build and maintained within the green tire throughout a curing cycle of the green tire.

Operatively, an interrogation signal may be received by the antennae 20, 22 from a remote transceiver (not shown) and transmitted to integrated circuitry within the package 12. The integrated circuitry may process the RF interrogation signal into a power signal for powering a logic circuit that includes conventional ROM, RAM, and/or other conventional memory storage devices and/or circuitry. Data transmission from the storage devices may thereby be enabled and stored data may be transmitted by the antenna 20, 22 back to an external devices reader or transceiver (not shown).

The transponder, or tag, 10 may be incorporated within various products and utilized to communicate stored data relating to such products to the remote reading device. The tag 10 thus may serve as a passive UHF radio frequency identification transponder that may enable, for example, automatic identification processes during a tire life cycle. Such identification may enable better process efficiencies in manufacturing, logistic supply chain, and during tire service for maintenance and other service transactions. These efficiencies may be realized from an accurate tracking capability provided through the use of an unique asset identifier. The identifier may be a 96-bit EPC code applied to the transponder 10.

Embedding the transponder 10 within the green tire as early as possible in the tire manufacturing process maximizes the potential benefits possible from use of the code identifier.

Figure 3:
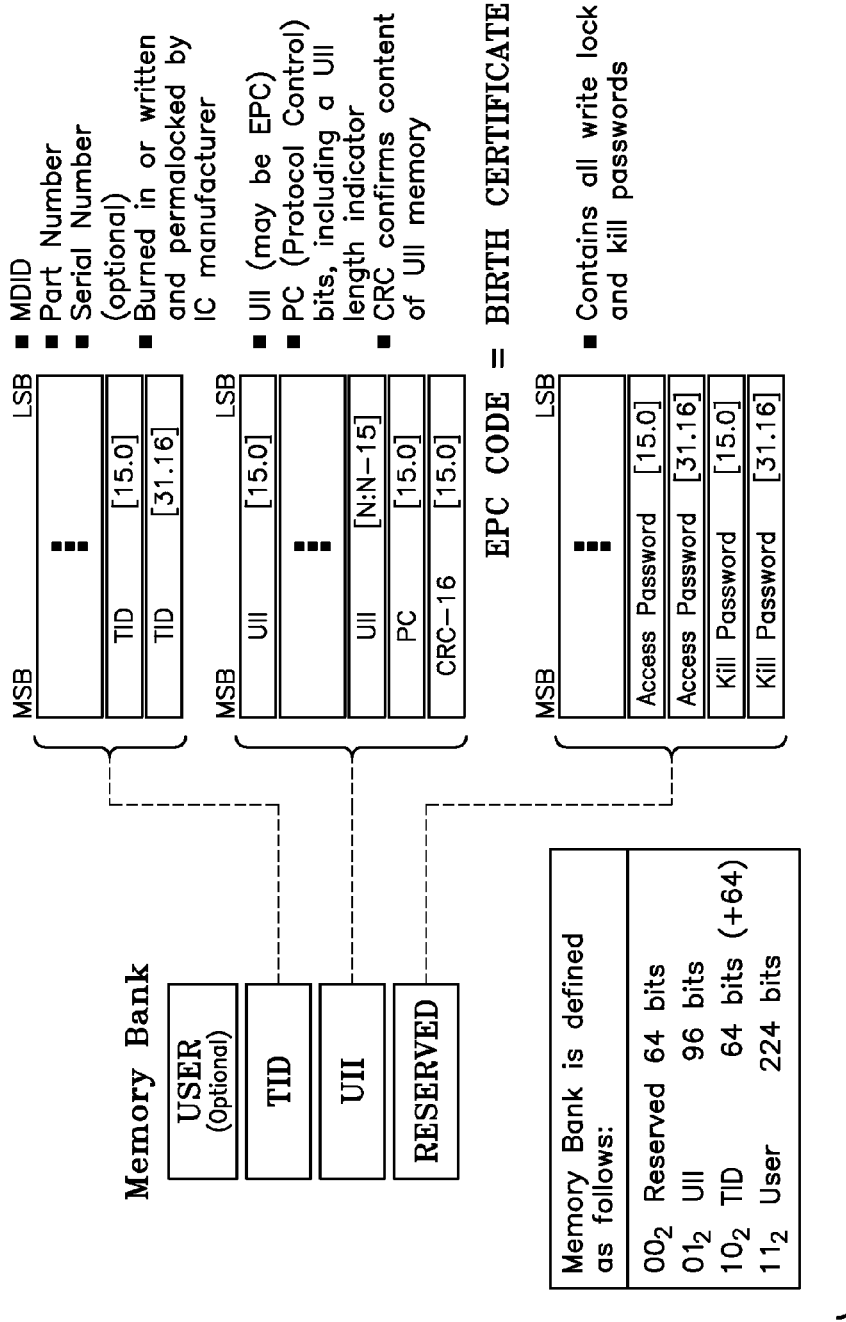
FIG. 3 is a functional block diagram of the tag memory.

FIG. 3 illustrates, in schematic form, a conventional electronic IC tag memory. The tag memory may provide tag identification, such a part number, serial number, etc., that may be burned in or written in permalocked status by an IC manufacturer. The identification number(s) may be thus accessible throughout tire build and tire use cycles/life. In addition, user identification may also be encoded into the tag such as an EPC number with associate protocol control and memory content confirmation CRC. The EPC code may be associated with the tag 12 embedded within a tire and thus represents a birth certificate for the tag and tire assembly, or aggregation. In addition, "write lock", "access", and "kill" passwords may be incorporated into the tag 12 for operational access/security purposes.

Referring to FIGS. 4A, 4B, 5A, 5B, exemplary tire and transponder assemblies are shown in which the tag 10 is affixed to a pneumatic tire 28 by suitable means, such as an adhesive. The pneumatic tire 28 may include a pair of beads 30 and a pair of apexes 32, each proximally situated radially outward of a respective bead 30. The apexes 32 may constitute a rubber filler that is placed above the beads in an area within the pneumatic tire where air could otherwise be trapped in its absence. Each of the apexes 32 may terminate at a radially outward apex end 33. One or more tire plies 34 44; an innerliner 36; and sidewalls 38 may further be added in an exemplary tire build. A belt package 40 may be located beneath the tread 42 at the crown of the pneumatic tire. The plies 34, 44 may constitute layers of rubber-coated cord fabric extending from bead 30 to bead 30 and turned up around the beads, thereby locking the bead into the assembly or carcass of the pneumatic tire 28. Parallel cords 46 may reinforce the tire plies 34, 44, formed by twisted fiber or filament of polyester rayon, nylon, steel, or other suitable material for providing the tire carcass and belt package appropriate strength. In general, the parallel cords 46 may extend from the bead 30 to bead 30 and reinforce the pneumatic tire 28.

A green, or uncured, pneumatic tire 28 may be constructed component by component. The beads 30 maintain the integrity of the green tire throughout the build process as plies are wrapped and turned up around the beads. The ply turnup 48 from the ply 44 may wrap under the beads, as shown. Each apex 32 may be positioned above and radially outward from a respective bead 30 and may extend to an apex end 33. A toe guard component 50 may be positioned during the tire build radially inside each bead 30. A chafer component 54 may be constructed of reinforcing material and may be positioned around each bead 30 and axially outward so as to engage a rim flange area to thereby protect chafing of the pneumatic tire 28 by the rim parts. The chafer 54 may extend to a chafer end 56.

Figure 4A:
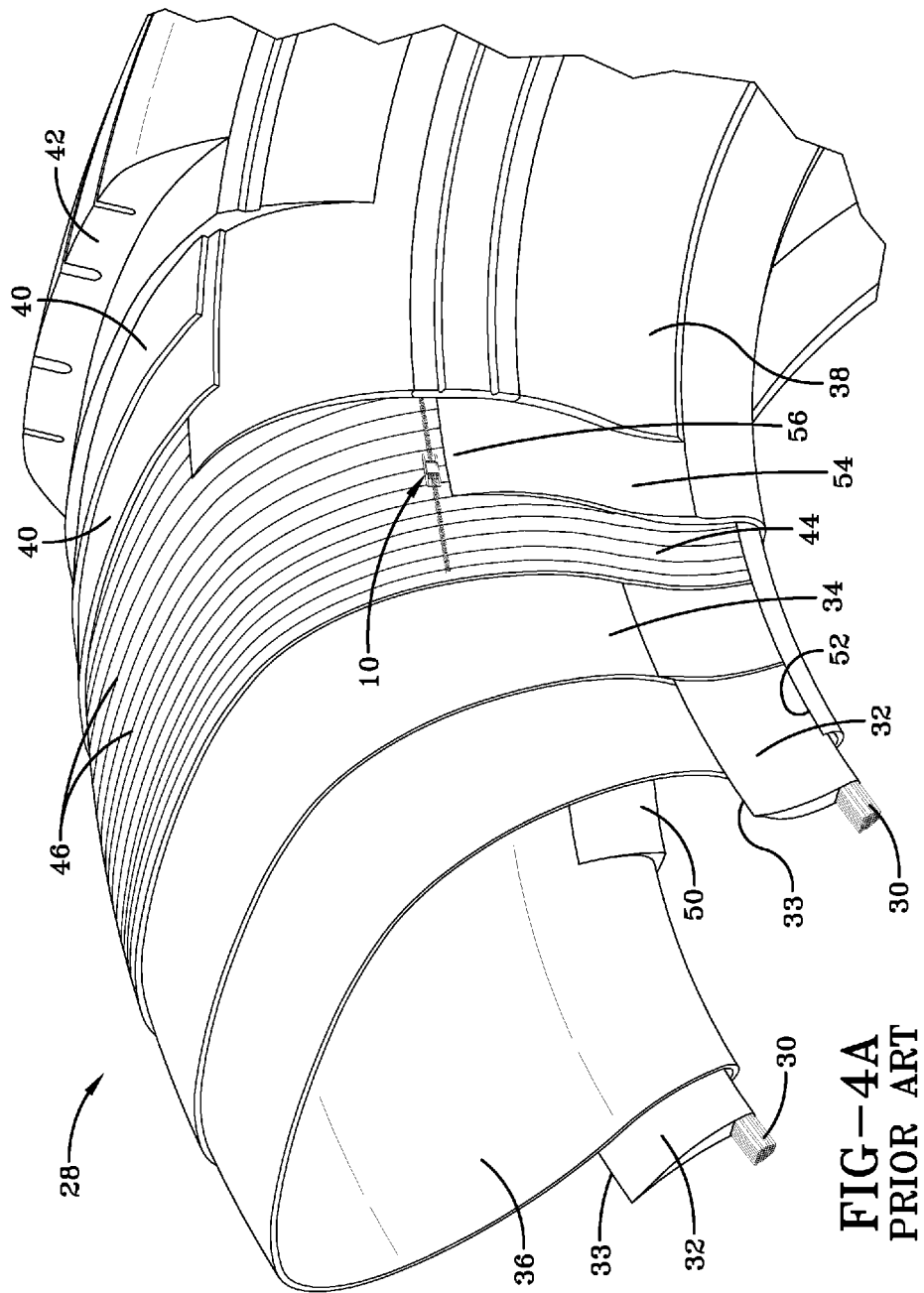
FIG. 4A is a perspective view of a prior art tire location for an electronic tag.
Figure 4B:
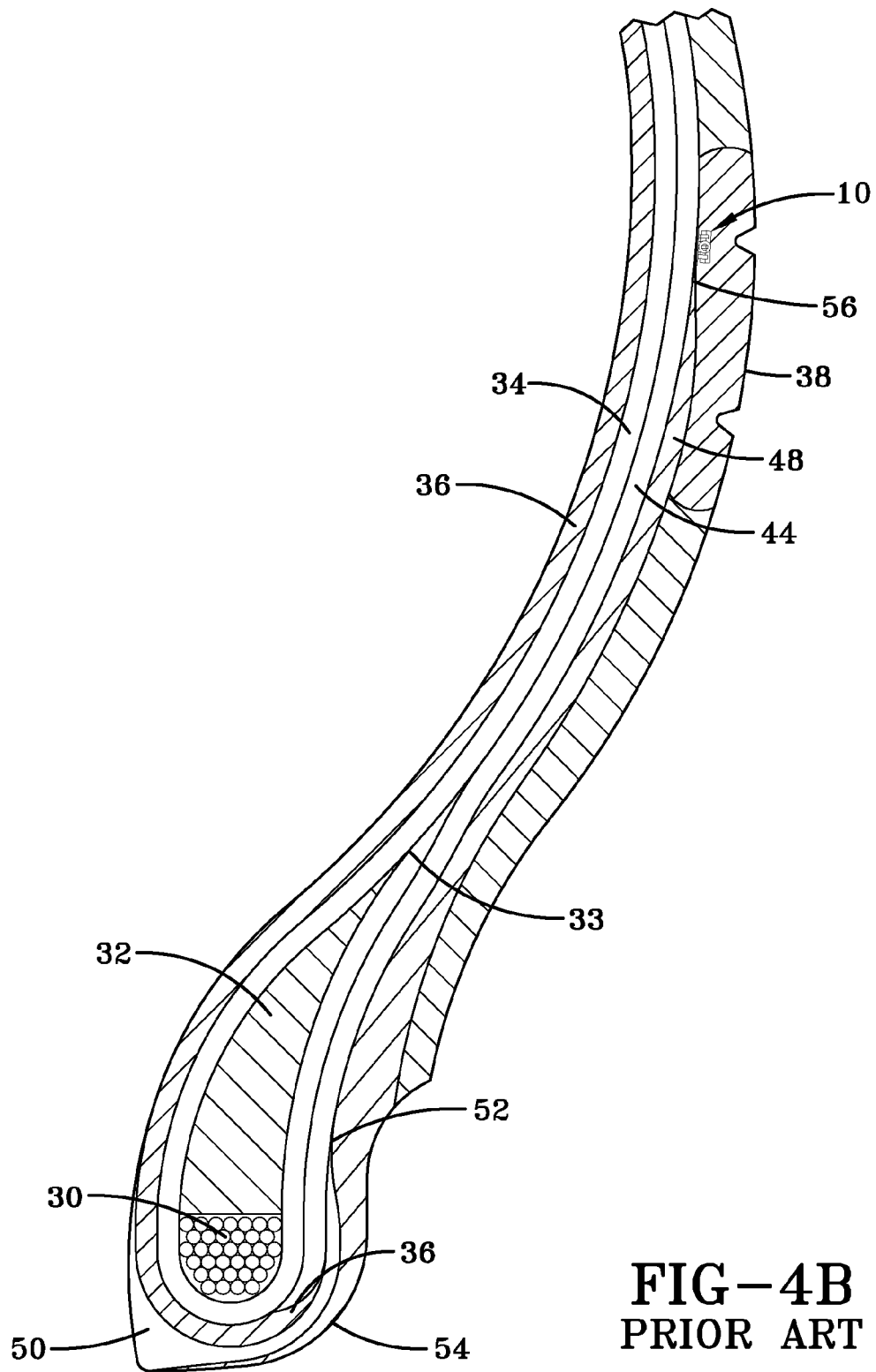
FIG. 4B is a section view of the alternative prior art tire location for an electronic tag of FIG. 4A.

The tag assembly 10, subsequent to a coating operation as shown in FIGS. 4A, 4B, 5A, 5B, may be introduced into the pneumatic tire 28 during the green tire build. As shown in FIGS. 4A, 4B, the tag assembly 10 may be located at a sidewall location above the apex 32, chafer 54, and ply turn-ups 48 between the ply 44 and the sidewall 38. The tag assembly 10 may be affixed to the ply 44 by suitable techniques, such as adhesive. The tag 10 may be oriented relative to the ply 44 such that the tag antennae 20, 22 extend perpendicularly to the circumferentially extending ply. In particular, for steel reinforced tires, the tag antennae 20, 22 may extend perpendicularly to the ply cords 46 within the ply 44. Embedding the tag assembly 10 in such an orientation may utilize the cords 46 of the ply 44 behind the tag assembly to provide structural support and reinforcement to the tag assembly.

While the antennae 20, 22 in the tag assembly 10 may be flexible, it is nonetheless desirable to limit the degree of flexure in the antennae to maintain the integrity of the antennae segments and their connection to the contacts 16 of the tag device 10. Orienting the antennae segments perpendicularly to the ply cords 46 thus may minimize flexure in the antennae 20, 22 during the life of the pneumatic tire 28.

While the location of the tag assembly 10, as shown in FIGS. 4A and 4B, may achieve a good reading from the tag by a remote reader, the sidewall 38 of the pneumatic tire 28 may be a high flexure region in a pneumatic tire. The flexing that occurs in such a location may cause damage to the tag assembly 10. Further, the presence of the tag assembly 10 in such a location may cause sidewall fatigue, damage, and/or separation. The tag assembly 10 may, as a result, have its integrity threatened by a harsh mechanical environment in the sidewall region 38.

Figure 5A:
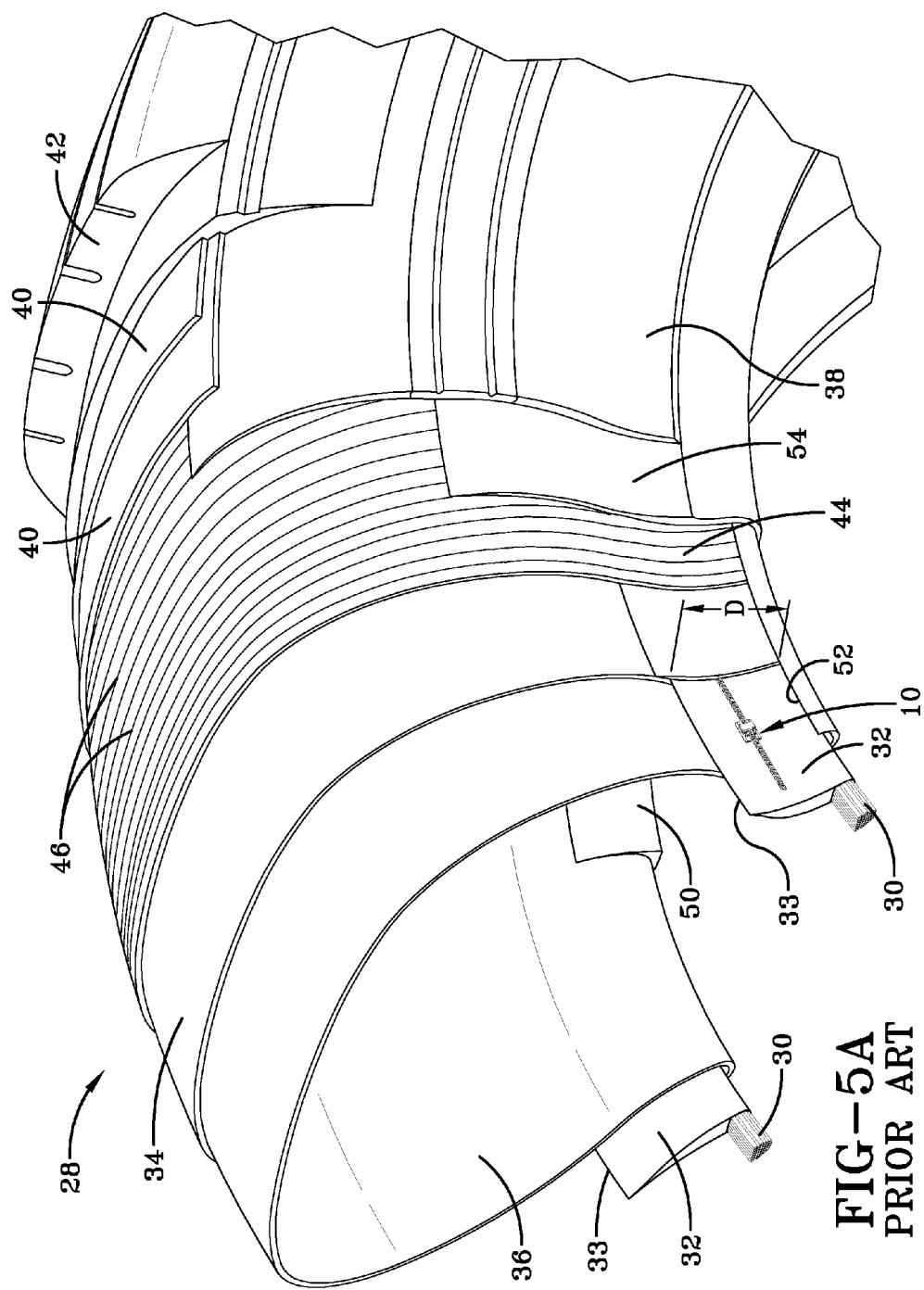
FIG. 5A is a perspective view of an alternative prior art tire location for an electronic tag.
Figure 5B:
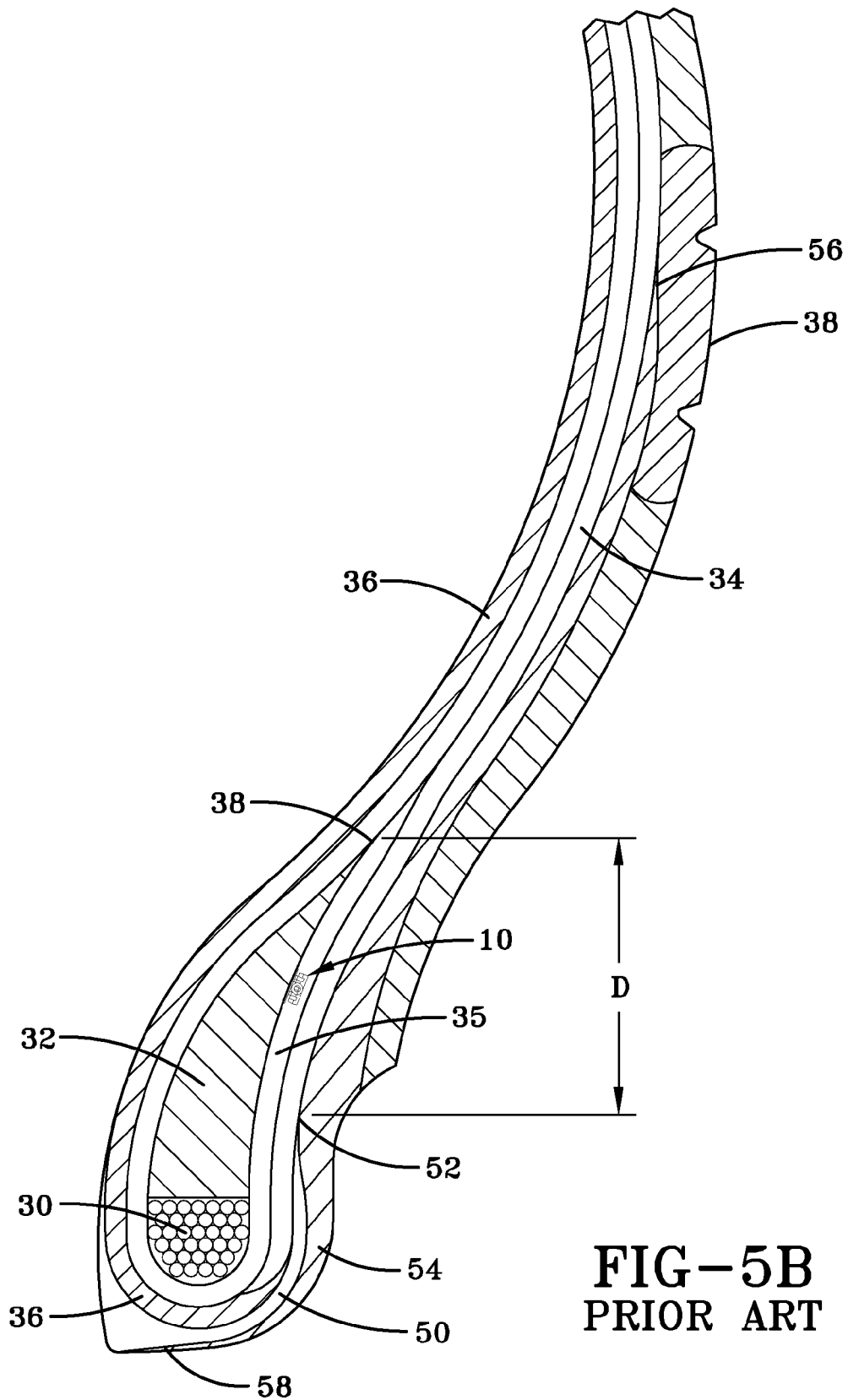
FIG. 5B is an enlarged section view of the alternative tire location of FIG. 5A.

Another location of the tag assembly 10 within the pneumatic tire 28 may alternatively be at the position of FIGS. 5A, 5B. Here, the tag assembly 10 may be positioned against an outer surface of the apex 32 between the apex and the turn-up 35 of ply 34. As with the tag position of FIGS. 4A, 4B, the orientation of the tag 10 in FIGS. 5A, 5B also places the antennae perpendicular to the direction of ply cords 46. The tag 10 may be placed against the outer surface of the apex 32 between ends of apex. The tag assembly 10 may be attached by suitable means, such as adhesive, directly to the outside of the apex 32. In the position shown in FIGS. 5A, 5B, the tag 10 may be located above (radially outward from) the ply-end 52.

While affixation of the tag 10 to the radially outward side of a tire apex 32 or ply 44, as shown in FIGS. 4A, 4B, 5A, 5B may be functional, the tag may not be shielded/insulated from an effect of geometric circumferential changes in the building drum during tire build formation. Such geometric changes may cause the tag 10 to move from its intended location to the detriment of tag performance. In addition, even at the intended location, the tag 10 may not provide optimum tag durability, read range, and/or performance when the pneumatic tire 28 (with tag) is subsequently mounted to a tire rim and deployed on a vehicle.

Figure 6:
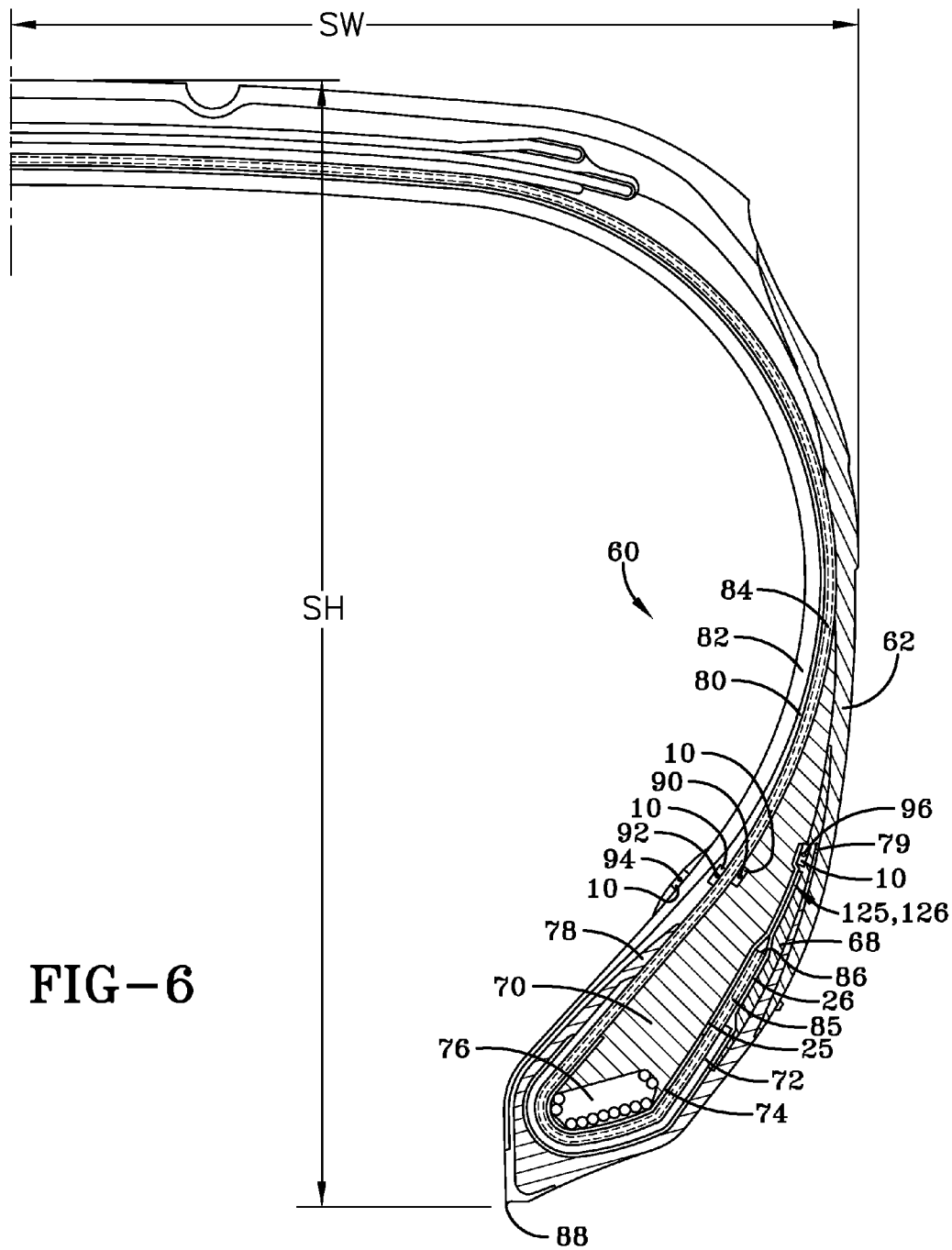
FIG. 6 is a section view showing alternative electronic tag locations comprising the invention.

FIG. 6 illustrates an exemplary pneumatic tire 60. The tire 60 may include a sidewall 62, a primary apex 68, and a secondary apex 70 positioned axially outward from the primary apex 68. A chipper component 72 and flipper component 74 may surround a bead bundle 76 and a chafer component 78 may underlie the bead bundle and extend radially outward to a position beneath the sidewall 62 at a radially outer end 79. An innerliner layer 82 may surround the tire cavity. A barrier layer, also referred herein as a "squeegee" layer 80, may be disposed axially outward and adjacent to the innerliner 82. The squeegee layer 80 may extend over a toeguard 88 at the base of the sidewall 62. A reinforcement ply 84 may be positioned axially outward from the squeegee layer 80 and may include a turn-up portion 85 wrapped about the bead bundle 76 and may extend to a ply turn-up end 86. A pair of apex components 68, 70 may be positioned within a single bead area with one apex 68 located radially outward from, and adjacent to, the other apex 70. For the purpose of dimensional explanation, the toeguard 88 at the bead region may be identified in FIGS. 6, 8 and referenced below.

The gum strips 125, 126 may carry the tag 10 and may, in one exemplary configuration, be located between the apexes 68, 70 such that the turn-up 85 from the ply 84 extends between the gum strips 125, 126 as shown in FIG. 6. In another alternate positioning of the tag 10, as shown at 90 in FIG. 6 and referred to herein as "ply/apex" location, the tag 10 may be positioned between the ply 84 and a radially inward surface of the secondary apex 70. The tag 10 may be affixed to the ply 84 during tire build by suitable means, such as adhesive. In still another alternate positioning of the tag 10, as shown at 90 or 92 in FIG. 6, the tag 10 may be positioned between a radially inward side of the ply 84 and the barrier layer 80. Position 92 may be referred herein as the "ply/barrier" location. In yet another alternate positioning of the tag 10, the tag 10 may be affixed to an inward facing surface of the inner liner 82 as shown at 94 in FIG. 6. Such a position may be utilized to effect a repair of the tag 10 during the useful life of the pneumatic tire 60, if necessary.

Figure 8:
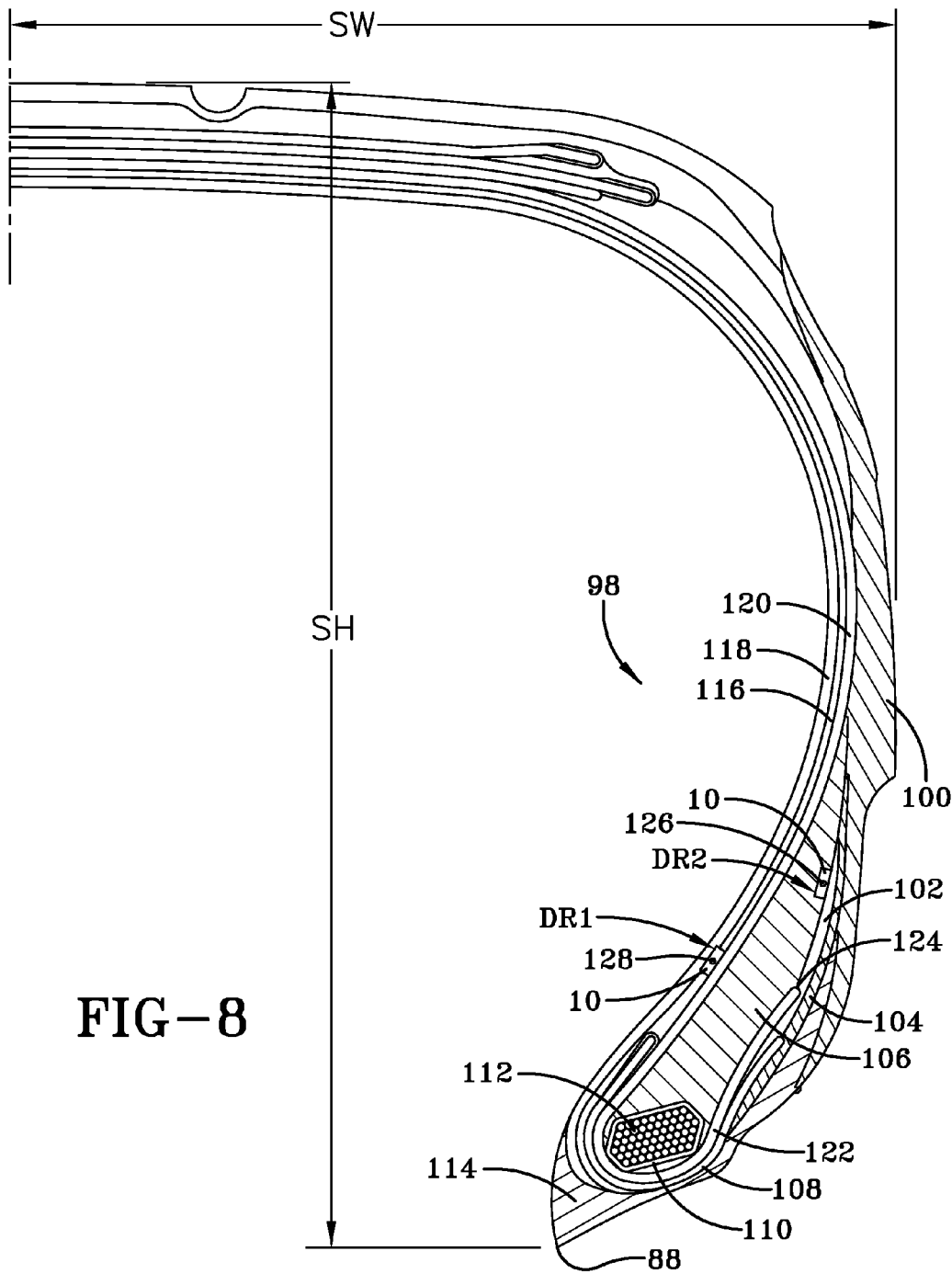
FIG. 8 is a section view through a tire bead region of an alternatively configured tire showing RFID Tag locations DR1 and DR2 relative to ply-end.

FIG. 8 illustrates an exemplary commercial pneumatic tire 98. The tire 98 may include a sidewall 100, one or more electronic tags 10 carried by gum strips 102, a primary apex 106, and a secondary apex 104 positioned axially outward from the primary apex. A chipper component 108 and flipper component 110 may surround a bead bundle 112. A chafer component 114 may underlie the bead bundle 112 and may extend radially outward to a position beneath the sidewall 100. An innerliner layer 118 may surround the tire cavity. A barrier layer 116, or "squeegee layer", may be disposed axially outward and adjacent to the innerliner 118. A reinforcement ply 120 may be disposed axially outward from the squeegee layer 116 and may include a turn-up portion 122 wrapped about the bead bundle 112 and extending to a ply turn-up end 124. The apex components 104, 106 may be positioned within the bead area with secondary apex 104 located radially outward from, and adjacent to, the primary apex 106. For the purpose of dimensional explanation, the toeguard 88 may be identified and referenced at the bead region in both FIGS. 6, 8 and used below for comparative tag position placement analysis.

The gum strip 102 may carry the tag 10, which may be placed in alternative tag locations 126, 128 in FIG. 8. In location 126, the RFID tag 10 may be located against the primary apex 106 between the primary apex and secondary apex 104. In location 128, the tag 10 may be placed in a "squeegee-ply" location wherein the tag is mounted to the ply 120 between the ply 120 and the squeegee barrier 116. Location 128 of FIG. 8 thus corresponds to the tag position 92 of FIG. 6.

Figure 7A:
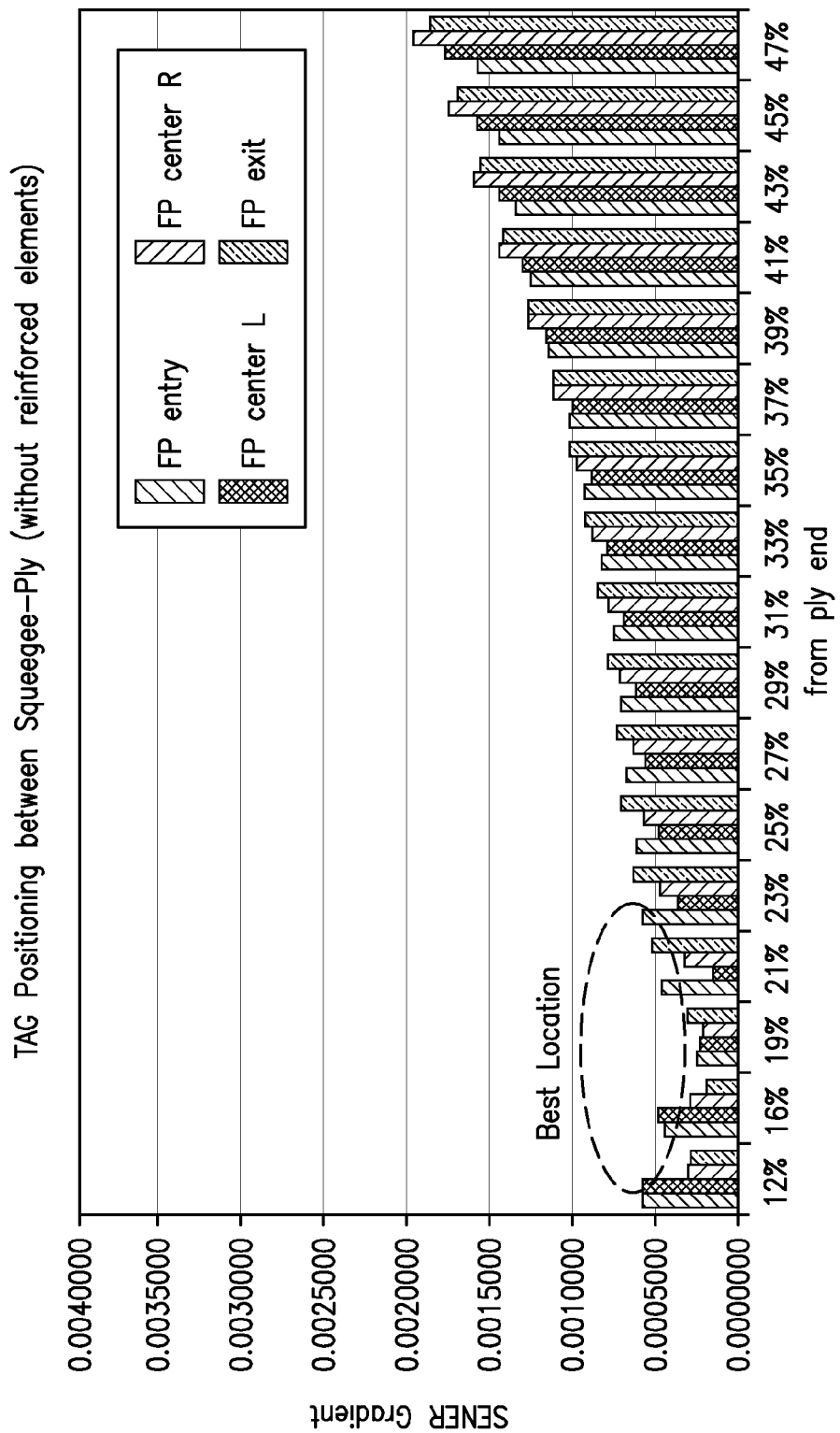
FIG. 7A is a graph of SENER Gradient vs. distance from Ply End at a Tag Position Between Squeegee Ply.
Figure 7B:
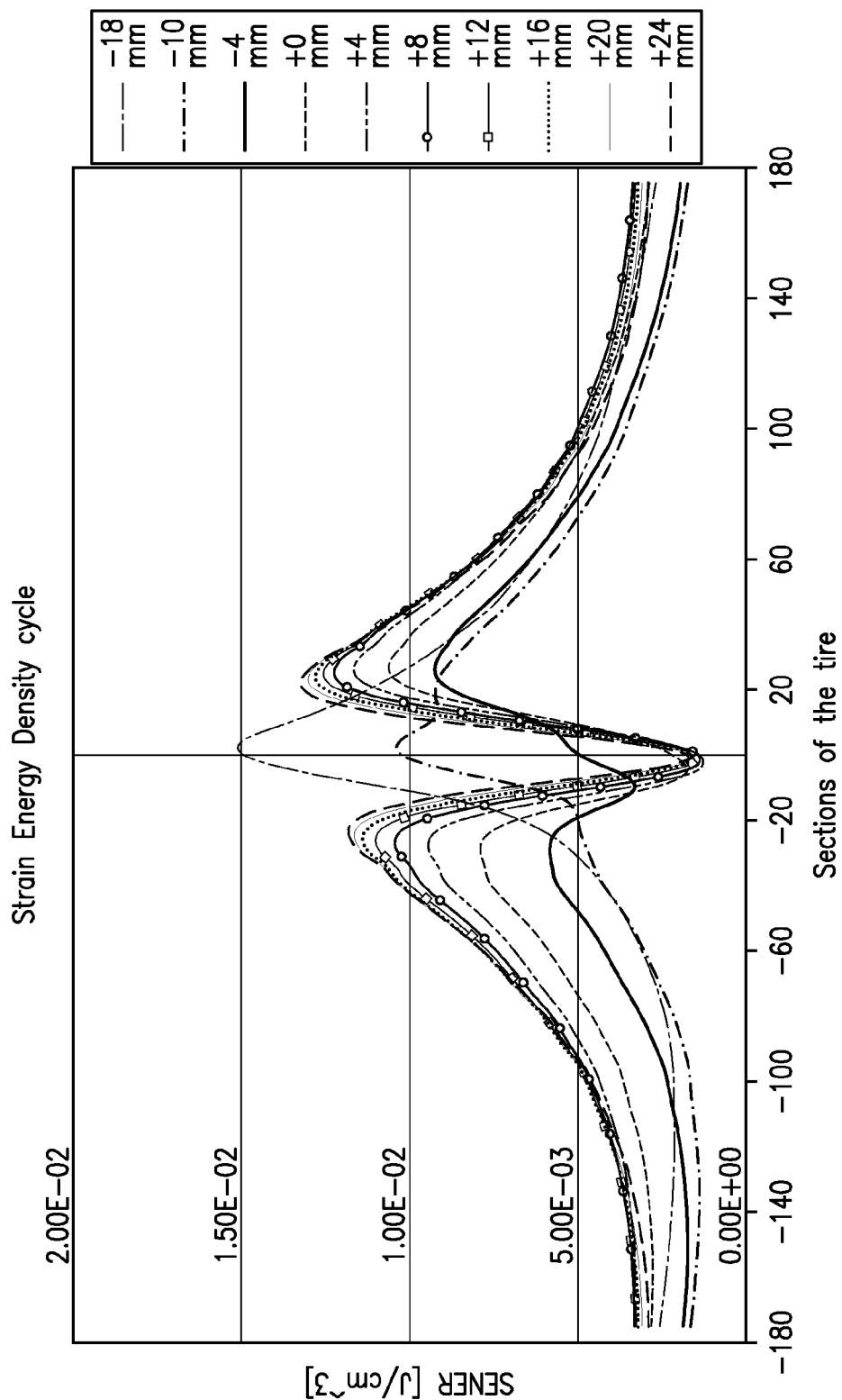
FIG. 7B is a graph of SENER Gradient vs. Strain Energy Density Cycle at Sections of the Tire.

With reference to FIG. 6, alternative tag positions 90, 92, 94, 96, and in FIG. 8, positions 126, 128, the tag 10 may encounter different strain levels within the pneumatic tire 60 that may affect output read performance of the tag. For the purposes of explanation, the positions 90, 92, 94, 96 (FIG. 6) and the locations 126, 128 (FIG. 8) may be differentiated by reference in a radial distance from the toeguard 88 of the sidewall 62, 100. FIGS. 7A, 7B demonstrate different strain levels in the tags 10 at different radial distances from the end of ply 86 for position 92 (ply/barrier) of FIG. 6 and from the end of ply 124 for location 126 of FIG. 8. In FIG. 7A, the SENER gradient versus tag distance from the ply end 86 (FIG. 6) is graphed. The graph of FIG. 7A shows by bar indicia the SENER gradient at footprint entry, center left, center right, and exit locations by the box within FIG. 7A. The performance of the tag 10 as the region of the tire 60, 98 to which it mounts enters and leaves the tire footprint is thus provided. The SENER gradient is a measurement of the dissipated energy from the tag due to a deformation of a measured element such as the tire mounting location of the tag. FIG. 7A depicts data for the defined position between ply and squeegee barrier layers. The cycle is defined by maximum and minimum. The smaller the SENER gradient at a given tag location, the smaller the dissipated energy and the better read performance provided by the tag 10. FIG. 7B shows a strain energy density cycle through sections of the tire 60, 98 along the horizontal axis from center against SENER levels in J/cm$^3$. The coded placement positions of the tag 10 are indicated vertically in the right-hand box of FIG. 7B and correspond to the placement positions of the tag indicated along the horizontal axis of FIG. 7A.

Figure 10:
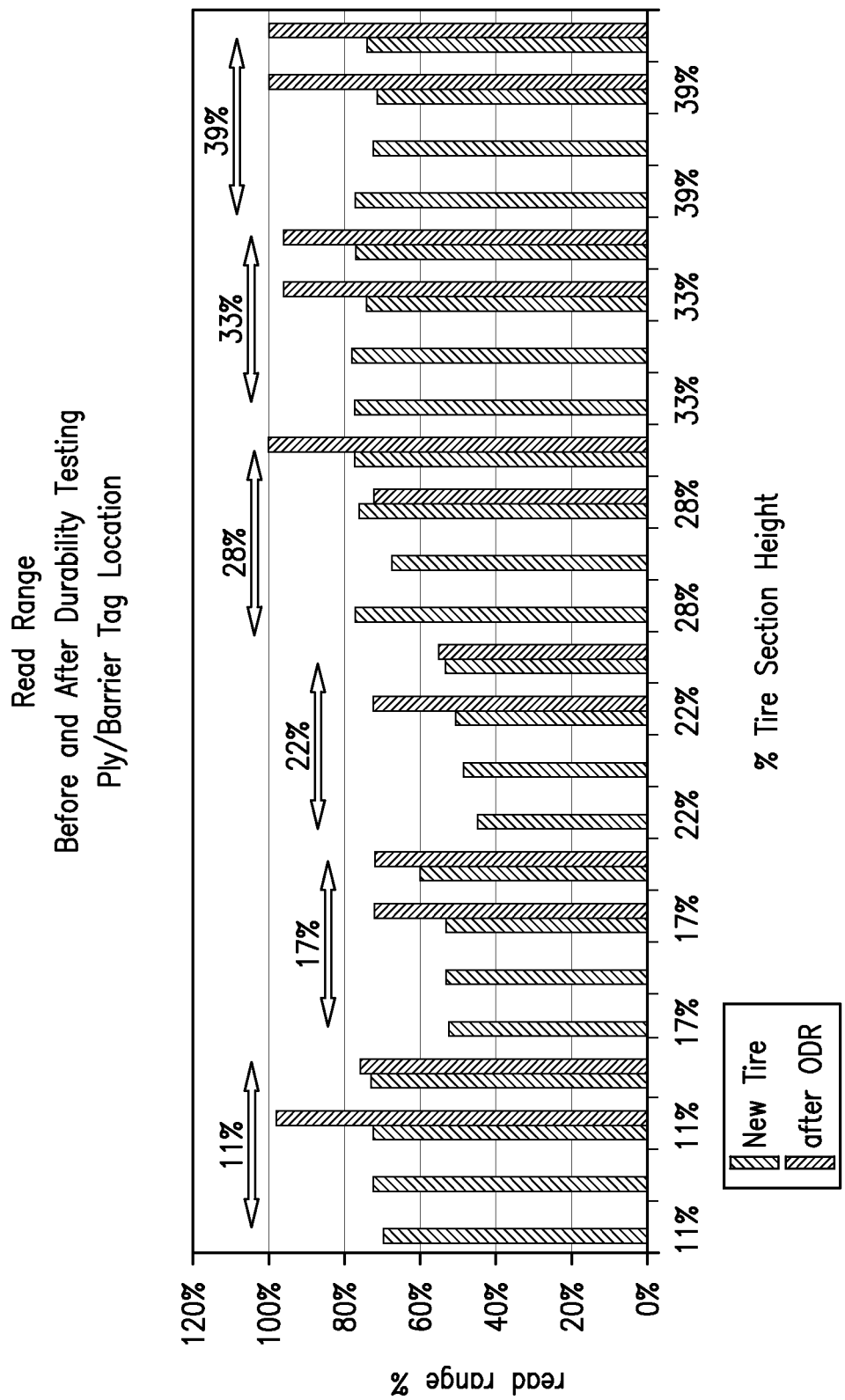
FIG. 10 is a graph of read range of a tag in a new tire and after durability testing at specified reference distances from ply end.

From an analysis of the results indicated by FIGS. 7A, 7B, the best location for read performance of the tag 10 may be between the squeegee and ply layers between 15 percent and 25 percent of the tire section height, as indicated in FIG. 6. An optimal range may thus be defined as the radial distance of the tag 10 measured from the toeguard 88, 15 percent to 35 percent of the tire section height, when considering a suitable range of commercial tire designs. FIG. 8 illustrates a method of referencing the alternative tag locations to the lower sidewall toeguard 88. An optimal tag position may be independent of ply ending location and a tag 10 so located may provide optimized read performance by means of a minimal energy dissipation. FIG. 10 illustrates read range modeling results with read range in percent against reference distance of the tag 10 from a ply turnup end 86, 124 in millimeters. Results for both new tire and durability tested tire conditions are shown. FIG. 10 confirms that the read range in the optimal range of 14 mm to 22 mm for location 92 in FIG. 6 and position 126 in FIG. 8 is indeed optimal.

Figure 9A:
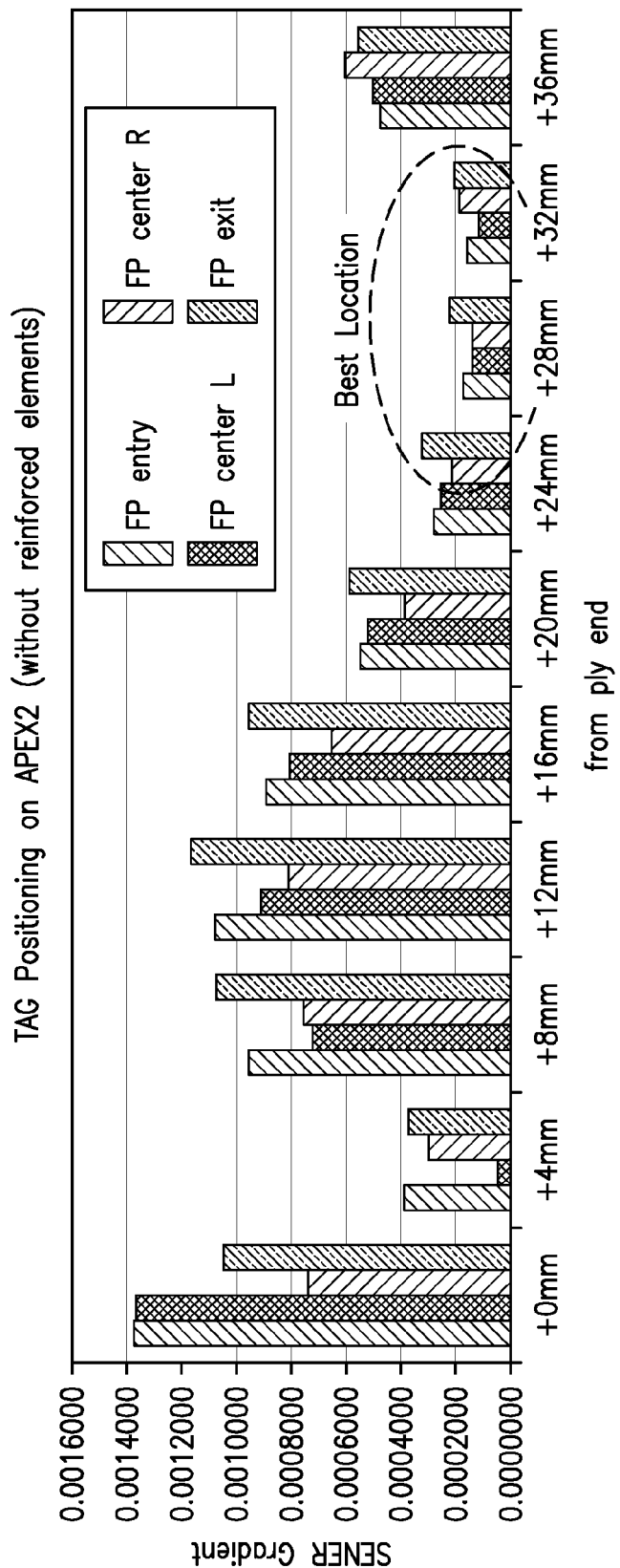
FIG. 9A is a graph of SENER Gradient vs. distance from Ply End at a Tag Position on APEX2 without reinforced elements.

A similar analysis to that summarized above for position 92 may be represented by FIGS. 9A, 9B for the location 96 of FIG. 6 for the tag 10. In position 96, the tag 10 is located between apexes 68, 70 and attached to the primary apex 68. FIG. 9A empirically demonstrates that an optimal location for an apex mounted tag position 96 may be between 18 mm and 26 mm from the ply end 86. The SENER measurements of FIGS. 9A, 9B demonstrate that in such a position, the tag 10 may experience optimized read performance and minimal energy dissipation.

By comparing the results from position 92 against position 96 (FIG. 6) or 126 (FIG. 8) for the tag 10, the SENER levels at positions 92, 126 show an advantage for the position of the tag 10 by a factor of 3, compared to position 96. The optimal ply/barrier positions 92, 126 are independent from the ply-ending height and thus may represent an optimum position across all sizes of tires, including flat base tires. A location of the tag 10 in the ply/barrier location 92, 126 may also facilitate a more precise and secure placement of the tag than the apex location 96, since the location 96 is more susceptible to movement due to tire building operations.

In summary, for an exemplary commercial tire incorporating a ply component oriented radially outward from a barrier component and one or more apex components, with the ply component extending about the bead location to a ply end, a beneficial result in read performance may be achieved by mounting a tag 10 at a location between the ply component and barrier component within a range of 14 mm and 22 mm above (radially outward from) the ply ending. Such a location may benefit read range capability of the tag 10 by reducing energy dissipation and placing the tag in a more secure location during tire building operations.

Figure 11:
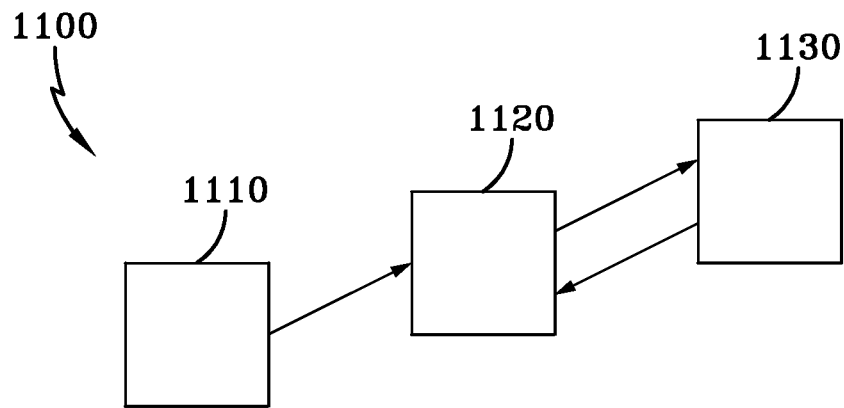
FIG. 11 is a schematic representation of part of a system in accordance with the present invention.
Figure 12:
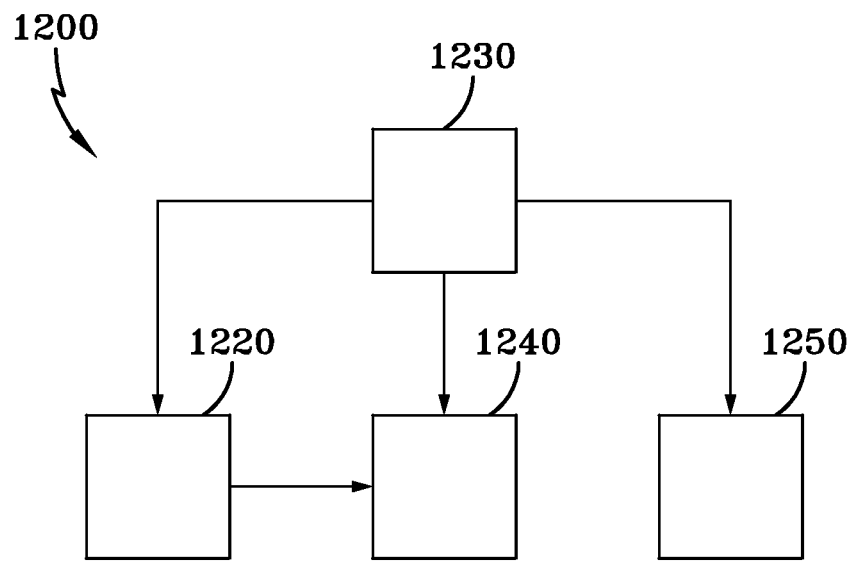
FIG. 12 is a schematic representation of another part of a system in accordance with the present invention.

The example mounting method described above may be used with a system 1100, 1200 in accordance with the present invention (FIGS. 11 & 12). An acoustic and/or vibration sensor 1110 may be mounted as above or in/on the tire 28, 60, 98 or wheel (not shown) in another manner. The sensor 1110 may transmit acoustic and/or vibration data via wired or wireless connection to a computer 1120 of the vehicle or another local device 1120, such as a GPS, smart phone, specialized device, and/or media unit. The data may be processed by such a receiver 1120 to calculate road conditions, analyze tread wear, etc.

Road conditions may be calculated by using coordinate locations of a GPS device in accordance with acoustic/vibration anomalies captured by the sensor 1110. Multiple vehicles at the same GPS coordinates may also capture data which indicates that there may be a pothole on road X at those GPS coordinates. The sensor data from these vehicles may be transmitted to a common repository 1130 where the data may be cross-referenced for this specific road section. A pothole or other anomaly may be confirmed and GPS maps may be updated to inform other future drivers to take an alternate route until the pothole or anomaly is repaired. Further, the pothole or anomaly may be made known to local authorities (via a manual or automated process) and the specific GPS coordinates may be given to repair crews to direct them to each such pothole or anomaly.

Tread wear may be assessed by analyzing audio and/or vibration levels and patterns from the sensor data. An acoustic and/or vibration baseline may be set at the time a tire 28, 60, 98, is installed by capturing the acoustic and/or vibration data at speeds X at GPS locations Y from the sensor 1100. Capturing speed and location information along with acoustic and/or vibration data may provide an initial set point for the pattern. The baseline may also be set via a manufacturer of the tire. Recommendations may be made from the processed data which may include tire rotation, traction control, vehicle adjustments (such as alignment), road quality, etc.

This sensor 1100 may be integrated into any vehicle (consumer or commercial) or machine (such as a tire testing device) with a spinning wheel. Thus, a real-time solution may be provided for notification and recommendations, such as tire rotation, traction control, vehicle adjustments (such as alignment), road quality, etc.

A central processor 1130 or 1230 may notify a driver via local devices 1120, 1220, a customer, a service center 1240, and/or local authorities 1250. As stated above, the central processor 1130, 1230 may communicate via internet, cellular, other wireless media, and/or wired media. Service centers 1240 may contact local customers and recommend an appointment for vehicle/tire repair. Data may also be uploaded when at a service center 1240 and the service center may then recommend appropriate service.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A system for maintaining integrity of a vehicle comprises:
   other vehicles for accurately determining road conditions;
   a sensor mounted to a tire;
   a processor for receiving data from the sensor, the processor analyzing the data and forming a status estimation of the vehicle, the wheel, and the tire, the processor further transmitting the status estimation and a recommendation for repair to an appropriate party,
   the processor receiving the data through an intermediate device comprising a hardwired network, the processor being in communication with a common repository such that data from the sensor is combined with data from sensors of the other vehicles for cross-referencing and determination of road conditions whereby the processor recommends tire rotation, a traction control update, and vehicle alignment to the appropriate party and the common repository determines the GPS coordinates of a pothole.

2. The system as set forth in claim 1 wherein the sensor is an acoustic sensor.

3. The system as set forth in claim 1 wherein the sensor is a vibration sensor.

4. The system as set forth in claim 1 wherein the data from the sensor is used by the processor for determining road conditions at selected GPS coordinates.

* * * * *